United States Patent [19]
Emmons et al.

[11] 3,992,333
[45] Nov. 16, 1976

[54] HIGHLY ABSORBENT COPOLYMERS AND FOAMED ARTICLES HAVING REWETTABILITY MADE THEREFROM

[75] Inventors: William D. Emmons, Huntingdon Valley; Vincent J. Moser, Hatboro; John G. Brodnyan, Langhorne; Norman Shachat, Levittown, all of Pa.

[73] Assignee: Rohm and Haas Company, Philadelphia, Pa.

[22] Filed: June 27, 1972

[21] Appl. No.: 266,784

Related U.S. Application Data

[62] Division of Ser. No. 134,904, April 16, 1971, Pat. No. 3,705,053.

[52] U.S. Cl. .................. 260/2.5 R; 260/2.5 L; 260/2.5 B; 260/17 R; 260/79.3 M
[51] Int. Cl.² ......................................... C08J 9/30
[58] Field of Search ............... 260/2.5 B, 79.3 MU

[56] References Cited
UNITED STATES PATENTS

| | | | |
|---|---|---|---|
| 2,256,483 | 9/1941 | Johnson | 260/2.5 E |
| 2,387,730 | 10/1945 | Alderson, Jr. | 260/2.5 E |
| 3,711,449 | 1/1973 | Brendley, Jr. | 260/79.3 MU |

*Primary Examiner*—Morton Foelak
*Attorney, Agent, or Firm*—Terence P. Strobaugh; George W. F. Simmons; Carl A. Castellan

[57] ABSTRACT

The present invention is concerned with new and improved binders for the production of foamed or cellular articles which have a high degree of absorbency, and retain their bonded character as well as absorbency through numerous wash-dry cycles. The cellular articles are bonded by a novel self-cross-linking binder comprising a copolymer of (a) N-methylol-amine or -amide units, (b) sulfonic acid units which contain no basic nitrogen atoms or group, and (c) certain acrylic units of neutral but mildly hydrophilic character which contain no basic nitrogen atoms or group.

4 Claims, No Drawings

HIGHLY ABSORBENT COPOLYMERS AND FOAMED ARTICLES HAVING REWETTABILITY MADE THEREFROM

This application is a division of our copending application Ser. No. 134,904, filed Apr. 16, 1971 now U.S. Pat. No. 3,705,053.

It is already known to use N-methylol-acrylamide in copolymers to be used for bonding non-woven fabrics and setting the binder in the fabric by heating the fabric impregnated therewith with a suitable acid catalyst to accelerate the crosslinking of the binder to insoluble condition on the fabric. When this is done, however, the bonded fabric generally becomes markedly less readily wettable than the fibrous mass that is used in making the bonded fabric. Hence, there is an undesirable water-repellency in the bonded mass which makes it relatively unsuitable for use as a wiping cloth or rag to remove and pick up liquids, as in washing furniture, as in kitchens in the home, or in washing cars.

Attempts have been made to overcome this disadvantage by selection of surfactant in the emulsion polymerization of the monomers to produce the binder and by the addition of a wetting agent to the impregnating medium by which the binder is applied to the non-woven fabric or to the composition that is converted to a cellular product. However, such expedients interfere with the removal of aqueous liquids when such fabrics or cellular products are used for wiping wet surfaces, cause smearing of the liquid over the surface, and, in most instances, serve for one time use only because the surfactant or wetting agent is removed during the first use.

In accordance with the present invention, a binder copolymer itself is modified to incorporate a component which provides improved absorbency and at the same time remains in the binder so that it is not removed during use, rinsing, or washing of the cellular article. The binder copolymer comprises a component (a), namely an N-methylol- or N-alkoxymethyl-substituted nitrogen-containing monoethylenically unsaturated monomer which imparts thermosetting qualities to the copolymer and may also serve to chemically bond the binder to any fibrous reinforcement in a cellular product made from the binder. The binder also comprises a component (b) namely, an $\alpha,\beta$-unsaturated monomer, which is copolymerizable with the nitrogen-containing monomer, contains a strong sulfur acid group having a pKa of 3.5 or less, but contains no basic nitrogen atom or group. This component serves to impart absorbency and rewettability. The balance (component (c)) of the binder copolymer, to make 100% by weight, may comprise one or more other $\alpha,\beta$-ethylenically unsaturated monomers which contain no basic nitrogen atom or group and are at the most only moderately hydrophobic so that this component does not overcome the hydrophilicity of the second-mentioned component and thereby cause excessive reduction of absorbent and wettable characteristics.

By basic nitrogen atom, it is intended to refer to the nitrogen atom in an ordinary amine group (primary, secondary, or tertiary). Such groups are normally basic in character. This definition excludes the nitrogen atom of a carboxylic acid amide group and that of a ureido or carbamide group.

For the first component there may be used various monomers containing a nitrogen atom substituted with at least one methylol or methoxymethyl group. More specifically, the monomer that is useful here contains a carboxamido group, a ureido group, or an amino group in which the nitrogen atom is attached to a carbon atom in the ring of a 1,3,5-triazine. The nitrogen of the carboxamido, ureido or amino group is methylolated to attach at least one methylol group to the nitrogen atom, and, if desired, the N-methylol derivative is converted to the corresponding N-methoxymethyl-substituted derivative, all in conventional manner. Examples of monomers containing carboxamido groups are those derivatives of the amides of monoethylenically unsaturated monocarboxylic and dicarboxylic acids having a group of the formula $H_2C=C<$, such as the N-methylol- and N-methoxymethyl-substituted derivatives obtained from acrylamide, methacrylamide, maleimide, maleamic acid, itaconamic acid, crotonamide, fumarimide, fumaramic acid, acryloxypropionamide, and so on. Of these, the preferred monomers are those having a terminal group of the formula $H_2C=C<$, such as acrylamide and methacrylamide.

N-methylolated or N-methoxymethyl derivatives of ethylenically unsaturated monomers containing ureido groups are also useful. Examples of such ureido monomers are:

Compounds of the formula (I)
$$H_2C=C(R)ZAN(R^3)CXNR'R^2$$
wherein R is H or methyl
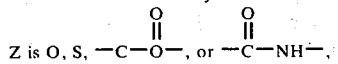

A is an alkylene group having 2 to 8 carbon atoms, $R^3$ is selected from the group consisting of H, alkyl groups having 1 to 4 carbon atoms, hydroxyalkyl groups having 1 to 4 carbon atoms, and alkoxymethyl groups having 2 to 5 carbon atoms.

X is oxygen or sulfur,

R' when not directly attached to $R^2$ is H, phenyl, methylbenzyl, benzyl, cyclohexyl or alkyl having 1 to 6 carbon atoms, hydroxyalkyl having 1 to 6 carbon atoms, N-alkoxyalkyl having 2 to 6 carbon atoms; $R^2$, when not directly attached to R', is H, phenyl, methylbenzyl, benzyl, cyclohexyl or alkyl having 1 to 6 carbon atoms, and R' and $R^2$, when directly connected together, may be the morpholino residue $-C_2H_4OC_2H_4-$, the piperidino residue $-(CH_2)_5-$ or the pyrrolidino residue $-(CH_2)_4-$,
at least one of R', $R^2$ and $R^3$ being methylol or methoxymethyl.

Examples of these compounds include:
N-methylol-$\beta$-ureidoethyl vinyl ether,
N-methylol-$\beta$-ureidoethyl vinyl sulfide,
N-methylol-$\beta$-thioureidoethyl vinyl ether,
N-methylol-$\beta$-thioureidoethyl vinyl sulfide,
N-methylol-$\beta$-ureidoethyl acrylate,
N-methylol-$\beta$-thioureidoethyl methacrylate,
N-methylol-N'-($\beta$-ureidoethyl)acrylamide,
N-methylol-N'-($\beta$-ureidoethyl)methacrylamide,
N-methylol-N'-$\beta$-methacryloxyethyl-urea.
N-methylol-N'-methylol-N'-$\beta$-acryloxyethyl-urea,
N-methoxymethyl-N'-$\beta$-vinyloxyethyl-urea.

Among the ureido-containing monomers, those containing a cyclic ureido group of the following Formula II are also quite useful.

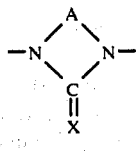 (II)

wherein A and X are as defined hereinbefore. The preferred cyclic ureido compounds are those which contain the group

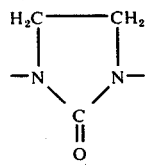 (III)

which may be termed the cyclic N,N'-ethyleneureido group.

In II or III, one of the nitrogen atoms is connected to a polymerizable monoethylenically unsaturated radical and the substituent on the other nitrogen may be methylol or methyoxymethyl.

Many other monoethylenically unsaturated monomers contain cyclic ureido groups and are useful for producing component (a) of the copolymer invention. Compounds of the following formulas wherein Y represents the group of Formula II above and $R^4$ is methylol or methoxymethyl are typical:

$H_2C=CHYR^4$  IV.

$H_2C=CHXAYR^4$  V.

wherein X and A are as defined hereinabove.

 (VI)

where R is selected from the group consisting of H and $CH_3$, Z is selected from the group consisting of —O— and $NR^5$, $R^5$ being selected from the group consisting of H, cyclohexyl, benzyl, and an alkyl group having 1 to 6 carbon atoms, and A is as defined hereinabove.

 (VII)

wherein R, Y, and $R^4$ are as defined hereinabove and $R°$ is H or alkyl having 1 to 12 carbon atoms;

 (VIII)

wherein R, R°, A, Y, and $R^4$ are defined hereinabove.

The N-[omega-(1,3-cyclodiazolidin-2-onyl)alkyl]-substituted unsaturated amic acids, their esters, and cyclic imides disclosed and claimed in U.S. Pat. No. 2,980,652, the disclosure of the patent being incorporated herein by reference are also useful. These compounds are not readily represented in generic scope by a single formula. The acids are those in which the nitrogen atom of maleamic acid, chloromaleamic acid, fumaramic acid, itaconamic acid, or citraconamic acid is substituted by, and directly connected to a group of the formula

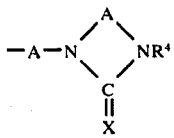 (VIII A)

wherein A, X and $R^4$ are as defined hereinabove. The N-substituted amic acid and esters derived from maleamic acid are typical and have the following generic formula

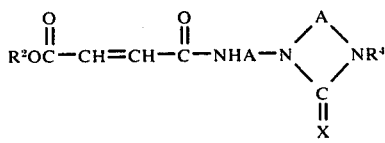 (IX)

in which A, $R^4$ and X are as defined hereinabove, and $R^2$ is an alkyl group having 1 to 12, preferably 1 to 4, carbon atoms. The internal cyclic imides derived from maleamic acid that are useful herein have the formula

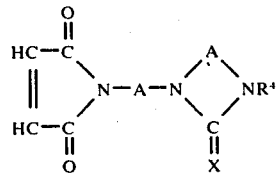 (X)

The unsaturated dicarboxylic acid monoesters of a compound of the formula $$HOA'—(OA)_{n-1}—N\diamond NR^4 \text{ (XI)}$$

wherein A' is a $(C_2-C_8)$alkylene group, n is an integer having a value of 1 to 4, and A and $R^4$ are as defined hereinbefore, derived from maleic, fumaric, chloromaleic, itaconic or citraconic acid. There may also be used the benzyl, cyclohexyl, and $(C_1-C_6)$ alkyl esters of any of the monoesters just described which are disclosed in U.S. Pat. No. 3,194,792, and the specific compounds disclosed therein are incorporated herein by reference. Specific examples include:

Methylolated β-(N,N'-ethyleneureido)ethyl acid maleate

Methylolated β-(N,N'-ethyleneureido)ethyl acid fumarate,

Methylolated methyl β-(N,N'-ethyleneureido)ethyl fumarate.

Additional illustrative examples of carboxamide type include those of U.S. Pat. No. 3,274,164 having the general formula

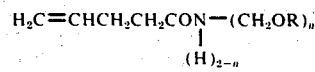  (XII)

wherein R is selected from the group consisting of H and alkyl having 1 to 18 carbon atoms, and $n$ is a number having an average value of about 0.8 to 2.0 and preferably having an average value of about 1.

Specific examples of the compounds represented by the several Formulas III to XII given above include:

A. Formulas III and IV
  N-vinyl-N'-methylol-N,N'-ethyleneurea
  N-vinyl-N'-methoxymethyl-N,N'-ethyleneurea B. Formula V
  N-vinyloxyethyl-N'-methylol-N,N'-ethyleneurea
  N-vinyloxyethyl-N'-methoxymethyl-N,N'-ethyleneurea
  N-vinylthioethyl-N'-methylol-N,N'-ethyleneurea.

C. Formula VI
  N-($\beta$-methacrylamidoethyl)-N'-methylol-N,N'-ethyleneurea
  N-($\beta$-acrylamidoethyl)-N'-methoxymethyl-N,N'-ethyleneurea
  N-($\beta$-acryloxyethyl)-N'-methylol-N,N'-ethyleneurea
  N-($\beta$-methacryloxypropyl)-N'-methylol-N,N'-propyleneurea
  N-($\beta$-acryloxyethyl)-N'-methoxymethyl-N,N'-ethyleneurea
  N-($\beta$-acryloxyethyl)-N'methylol-N,N'-ethylenethiourea D. Formula VII
  N-acrylamidomethyl-N'-methylol-N,N'-ethyleneurea
  N-acrylamidomethyl-N'-methylol-N,N'-propyleneurea E. Formula VIII
  N-[$\beta$-($\alpha$-acryloxyacetamido)ethyl]-N'-methylol-N,N'-ethyleneurea
  N-[$\beta$-($\alpha$-methacryloxyacetamido)ethyl]-N'-methylol-N,N'-ethylenethiourea
  N-[$\beta$-($\alpha$-methacryloxyacetamido)ethyl]-N'-methylol-N,N'-ethyleneurea F. Formulas IX, X, XI, and related compounds from other unsaturated dicarboxylic acids
  N-[$\beta$-($\beta$-carboxyacrylamido)ethyl]-N'-methylol-N,N'-ethyleneurea
  N-[$\beta$-($\beta$-carbomethoxyacrylamido)ethyl]-N'-methoxy-methyl-N,N'-ethyleneurea
  N-[$\beta$-($\beta$-ethylcarbony)-acrylamido)ethyl]-N'-methylol-N,N'-ethyleneurea
  N-[$\beta$-(-carbomethoxyacrylamido)propyl]-N'-methylol-N,N'-propyleneurea
  N-[$\beta$-($\beta$-(methylcarbonyl)acrylamido)ethyl]-N'-methoxymethyl-N,N'-ethyleneurea.
  Methylolated 1-[2-($\beta$-trans-carbomethoxyacrylamido)-ethyl]-imidazolidinone-2 (See Ex. 5 of U.S. Pat. No. 2,986,652).

G. Formula XII
  The most useful of these compounds are N-methylol- and M-methoxymethyl-4-pentenamide.

N-methylol- or N-methoxymethyl-substituted aminotriazines in which the thus-substituted amino group is attached to a carbon atom of a 1,3,5-triazine ring containing an ethylenically unsaturated substituent having a group $H_2C=C<$ can also be used as component (a) of the copolymer. They may have the general formula

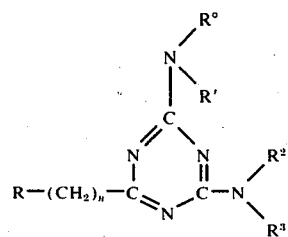  (XIII)

wherein $n$ is 0 or 1, $R°$ is selected from the group consisting of H, $CH_2OH$, and $CH_2OCH_3$, $R'$ is selected from the group consisting of H, $CH_2OH$, and $CH_2OCH_3$, $R^2$ is selected from the group consisting of H, $CH_2OH$ and $CH_2OCH_3$, $R^3$ is selected from the group consisting of H, $CH_2OH$, and $CH_2CH_3$ at least one of $R°$, $R'$, $R^2$, and $R^3$ being methylol or methoxymethyl, and R is an alkenyl group having 2 to 9 carbon atoms and a terminal group $H_2C=C<$. In other terms, the group R is an alkenyl group of the formula $-C_nH_{2n-1}$ in which $n$ has a value of 2 to 9, which alkenyl group has a terminal group $H_2C=C<$. Examples in which $n$ is zero include N-methylolacryloguanamine, N-methoxymethylacryloguanamine, N-methylol-3-butyroguanamine, and N-methylol-methacryloguanamine. When $n$ is 1 and R has at least 3 carbon atoms, especially valuable monomers are embraced by the formula in which the double bond of the side chain substituent is in nonconjugated relationship in respect to the double bonds of the ring. Examples are N-methylol- or N-methoxymethyl-4-pentenoguanamine and the related compounds disclosed in U.S. Pat. No. 3,446,777.

Generally, it is undesirable to include in the copolymers of the present invention an amino compound that is moderately or strongly basic in character. However, the monomers which contain an amino group, the nitrogen atom of which attached directly to a carbon atom in the ring of a 1,3,5-triazine is only weakly basic and does not interfere with the meritorious qualities of the resulting copolymers.

The amount of N-methylol-or N-methoxymethyl substituted monomeric material required in the binder copolymer may be as low as about 0.2% by weight based on the weight of the copolymer, or it may be as high as about 10% by weight. Preferred copolymers contain about 0.5 to 4% by weight of such a monomer or mixture thereof.

The second component of the binder copolymer may also be derived from a wide range of monomers. Examples include ethylenesulfonic acid (vinylsulfonic acid), allylsulfonic acid, methylallysulfonic acid, 2-acrylamido-2-methyl-propanesulfonic acid, 2-acrylamido-2-methyl-butane-3-sulfonic acid, and the unsaturated aromatic sulfonic acids of U.S. Pat. No. 2,527,300, especially those of the formula

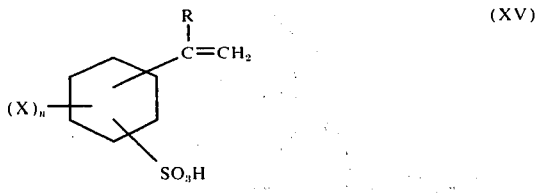

wherein R is hydrogen, methyl, or a halogen,

X is an alkyl group containing from 1 to 4 carbon atoms or a halogen atom, n is zero or a whole number from 1 to 3, and the total number of carbon atoms in $(X)_n$ is not over 4.

Also useful are the sulfo-esters of a-methylene carboxylic acids of U.S. Pat. No. 3,024,221 or of U.S. Pat. No. 2,964,557 having the following formula

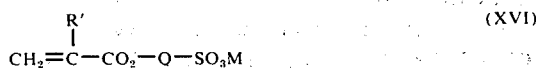

wherein the symbol R' represents hydrogen, a halogen such as chlorine, or an organic radical such as an alkyl radical, the symbol —Q— represents a bivalent organic radical having 2 to 10 carbon atoms and having its valence bonds on two different carbon atoms, such as an alkylene or arylene radical, and M is a member of the group consisting of hydrogen, ammonium bases, and metals. The term "sulfo ester" of an α-methylene carboxylic acid is used herein to means an ester corresponding to a carboxylate ester of an α-methylene carboxylic acid and a hydroxy organic compound, which latter compound has, as substituent on a carbon atom thereof, a sulfo group, i.e. a sulfonic acid group ($-SO_3H$) or a salt thereof such as a sodiosulfo ($-SO_3Na$) group.

In instances where —Q— is an aliphatic radical, the sulfo esters are representable by the formula

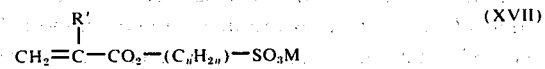

wherein n is an integer, preferably from 2 to 4, including instances where $-C_n H_{2n}-$ is a straight chain. Another group of monomers useful for this component are those disclosed in copending application of William D. Emmons and Graham Swift, Ser. No. 134,905, entitled "Sulfonic Acid Monomers and Polymers", filed Apr. 16, 1971, having the formula

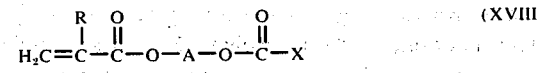

wherein R is hydrogen or methyl,

A is an alkylene group having 2 to 6 carbon atoms, at least 2 of which extend in one chain between the oxygen atoms, and X is an aromatic nucleus having 6 to 10 carbon atoms or an alkyl group having 2 to 10 carbon atoms, substituted by a sulfonic acid group and optionally one or more groups selected from sulfonic acid, carboxylic acid, and lower alkyl, such as methyl, ethyl, propyl, or butyl.

The proportion of monomeric component (b) in the copolymer may vary widely depending on its hydrocarbon content and also on the content and hydrophobicity of component (a) and of component (c), if any of the latter is present, after curing of the copolymer. There may be as little as about 0.2% by weight of monomeric component (b) in the copolymer and there may be as much as 15% by weight thereof in the copolymer, particularly when the hydrocarbon content or the content of the monomer other than hydrophilic groups is quite large. However, in most instances, a relatively lower porportion of monomer (b) is present; thus in preferred instances, there is from about ½ to 8 weight percent of monomeric component (b) and the balance of the copolymer units (c) to make 100%, may be composed of vinyl acetate, acrylonitrile, a lower alkyl acrylate or methacrylate in which the alkyl group has 1 to 4 carbon atoms and is preferably methyl or ethyl acrylate. As part of component (c) there may also be used a higher alkyl acrylate or methacrylate having 5 to 12 carbon atoms in the alkyl group in an amount of up to 30% by weight of the copolymer. There may also be present, in an amount of about 0.1 to 5 percent by weight, based on the copolymer weight, of one or more monomers having a reactive hydrogen atom. Such monomers include those having an amino group in which the nitrogen atom is attached to a carbon atom of a 1,3,5-triazine ring, amido, carboxylic acid, hydroxyl, and mercapto groups, such as acrylamide, methacrylamide, acrylic acid, methacrylic acid, itaconic acid, hydroxyethyl acrylate and mercaptoethyl methacrylate.

Speicifc examples of monomers of component (b) include:

o-, m-, or p-styrene sulfonic acids
o-, m-, or p-isopropenylbenzene sulfonic acids
o-, m-, or p-alpha-chlorostyrene sulfonic acids
o-, m-, or p-alpha-bromostyrene sulfonic acids
2-vinyl-3-chlorobenzenesulfonic acid
2-vinyl-4-bromobenzenesulfonic acid
2-vinyl-5-fluorobenzenesulfonic acid
2-vinyl-6-chlorobenzenesulfonic acid
2-bromo-3-vinylbenzenesulfonic acid
3-vinyl-4-chlorobenzenesulfonic acid
3-vinyl-5-bromobenzenesulfonic acid
3-chloro-4-vinylbenzenesulfonic acid
2-fluoro-4-vinylbenzenesulfonic acid
2-isopropenyl-3-chlorobenzenesulfonic acid
2-bromo-3-isopropenylbenzenesulfonic acid
3-chloro-4-isopropenylbenzenesulfonic acid
2-vinyl-3-methylbenzenesulfonic acid
2-vinyl-4-ethylbenzenesulfonic acid
3-isopropenyl-4-methylbenzenesulfonic acid
3-ethyl-4-vinylbenzenesulfonic acid
2-vinyl-3,6-dichlorobenzenesulfonic acid
3-vinyl-4-methyl-5-chlorobenzenesulfonic acid
1-methoxy-4-sulfo-6-vinylnaphthalene
3-isopropenyl-1-naphthalenesulfonic acid
1-sulfo-3,6-dichloro-4-vinylnaphthalene Also suitable for use in the preparation of the new copolymers are those unsaturated aromatic sulfonic acids in which the $CH_2=C<$ group is attached not directly to a nuclear carbon, as in the above-listed examples, but to an aliphatic carbon. Thus, allylbennzenesulfonic acids, methallylbenzenesulfonic acids, and haloallylbenzenesulfonic acids as, for example, 2-allylbenzenesulfonic acid
3-beta-methallylbenzenesulfonic acid 4-beta-bromallybenzenesulfonic acid
may be used.

Aromatic sulfonic acids in which the sulfonic acid group is attached not to a nuclear carbon but to an aliphatic carbon atom are also suitable for use according to the present invention, including acids having the general formula

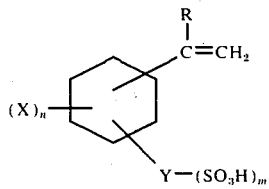
(XIX)

in which X may be a halogen atom or an alkyl group having 1 to 4 carbon atoms,

R is hydrogen or methyl or a halogen atom,

Y is a divalent aliphatic, saturated hydrocarbon radical having from 1 to 4 carbon atoms, m is 1 or 2, and n is zero or a whole number from 1 to 3. Some examples of such acids are:
 o-, m-, or p-vinylphenylmethanesulfonic acids
 o-, m-, or p-vinylphenylethanesulfonic acids
 o-, m-, or p-isopropenylphenyl-n-butanesulfonic acids
 o-, m-, or p-alpha-chlorovinylphenyl-n-propanesulfonic acids
 2-vinyl-3-chlorophenylmethanesulfonic acid
 2-vinyl-4-chlorophenylethanesulfonic acid
 2-vinyl-5-bromophenyl-n-butanesulfonic acid
 2-vinyl-3-methylphenylmethanesulfonic acid
 2-vinyl-4-ethylphenyl-n-propanesulfonic acid
 3-methyl-4-alpha-chlorovinylphenylmethanesulfonic acid
 2-vinyl-4-ethyl-6-chlorophenyl-ethanesulfonic acid
 1-[2-vinylphenyl]-n-butanedisulfonic acid-2,4
 1-[4-vinylphenyl]-ethanesulfonic acid-1
 4-[3-vinylphenyl]-2-butanesulfonic acid-2

Sulfonic acids containing sulfonic acid groups attacheed both to nuclear and aliphatic carbon atoms may also be used as, for example, 1-sulfo-3-vinylphenylmethanesulfonic acid.

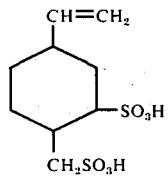

It is preferred to use the aromatic sulfonic acids in the form of their alkali metal salts for copolymerization. The alkali metal sulfonate groups in the resinous copolymer product may be readily hydrolyzed to the free acid by treatment with acid as in the usual process for regeneration of exhausted cation exchange resins.

Heterocyclic sulfonic acids containing the necessary $CH_2=C<$ group are also operative in the preparation of copolymers of the present invention. A few examples of such acids are:
 2-sulfo-5-allylfurane
 2-sulfo-4-vinylfurane
 2-sulfo-5-vinylthiophene Aliphatic sulfonic acids suitable for use in the present invention include those represented by the general formula

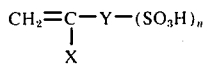

in which X may be hydrogen or a group such as halogen, carboxyl, sulfo, cyano, carbamyl, nitro, aryl, i.e., phenyl, tolyl, xylyl, naphthyl, etc., saturated aliphatic hydrocarbon radicals having from 1 to 5 carbon atoms, i.e., methyl, ethyl, isopropyl, n-butyl, isobutyl, tert. butyl, n-amyl, isoamyl, tert, amyl, and the radicals —COOR, —COR, —CONR$_2$, —OR, and RCOO— in which R may be any organic hydrocarbon group, saturated aliphatic or aromatic, but is preferably an alkyl group of from 1 to 5 carbon atoms, Y is a divalent aliphatic saturated radical of from 1 to 4 carbon atoms, and n is 1 to 2.

Thus, there may be used, in addition to ethylenesulfonic acid itself,
 1-bromoethylenesulfonic acid
 1-cyanoethylenesulfonic acid
 1-carbamylethylenesulfonic acid
 1-nitroethylenesulfonic acid
 1-phenylethylenesulfonic acid
 1-isopropylethylenesulfonic acid
 1-carbethoxyethylenesulfonic acid
 1-carbophenoxyethylenesulfonic acid
 1-acetylethylenesulfonic acid
 1-naphthoylethylenesulfonic acid
 1-amoxyethylenesulfonic acid
 1-biphenyloxyethylenesulfonic acid
 1-acetoxyethylenesulfonic acid
 1-benzoxyethylenesulfonic acid
 2-propenesulfonic acid
 3-butenesulfonic acid
 5-hexenesulfonic acid
 2-sulfopropene-1
 3-sulforbutene-1
 2-methyl-4-pentenesulfonic acid
 3-chloro-3-butenesulfonic acid
 2-ethyl-3-butenesulfonic acid Sulfonic acids containing more than a single acid radical, sulfonic or otherwise, may also be used in the preparation of the new copolymers, i.e.
 α-sulfoacrylic acid
 α-sulfoethylenesulfonic acid
 3-sulfo-4-pentenesulfonic acid
 3-vinyl-5-sulfobenzoic acid
 2-vinyl-1,5-benzenedisulfonic acid
 2-vinyl-3-sulfophenylmethanesulfonic acid
 3-vinyl-4-sulfomethylbenzoic acid Instead of the sulfonic acids of the type disclosed as suitable for use in the present invention, derivatives thereof which are hydrolyzable to the acids may be copolymerized with component a) and optionally c) and the copolymer then hydrolyzed in order to provide free sulfonic acid groups. Alkali metal salts of the sulfonic acids may be used.

The following are also useful monomers for group (b):
 2-sulfoethyl acrylate
 2-sulfoethyl methacrylate
 2-sulfoethyl α-ethylacrylate 2-sulfoethyl α-propylacrylate
2-sulfoethyl α-butylacrylate
2-sulfoethyl α-hexylacrylate
2-sulfoethyl α-cyclohexylacrylate
2-sulfoethyl α-chloracrylate
2-sulfo-1-propyl acrylate
2-sulfo-1-propyl methacrylate
1-sulfo-2-propyl acrylate and methacrylate
2-sulfo-1-butyl acrylate and methacrylate
1-sulfo-2-butyl acrylate and methacrylate
3-sulfo-2-butyl acrylate and methacrylate
2-methyl-2-sulfo-1-propyl acrylate and methacrylate
2-methyl-1-sulfo-2-propyl acrylate and methacrylate
3-bromo-2-sulfo-1-propyl acrylate
3-bromo-1-sulfo-2-propyl acrylate
3-chloro-2-sulfo-1-propyl acrylate
3-chloro-1-sulfo-2-propyl acrylate
1-bromo-3-sulfo-2-butyl acrylate
1-bromo-2-sulfo-3-butyl acrylate
1-chloro-3-sulfo-2-butyl acrylate
1-chloro-2-sulfo-3-butyl acrylate
3-bromo-2-sulfo-1-butyl acrylate
3-bromo-1-sulfo-2-butyl acrylate
3-chloro-2-sulfo-1-butyl acrylate
3-chloro-1-sulfo-2-butyl acrylate
1-chloro-2-methyl-3-sulfo-2-propyl acrylate
1-chloro-2-methyl-2-sulfo-3-propyl acrylate
1-chloro-2-(chloromethyl)-3-sulfo-2-propyl acrylate
1-chloro-2-(chloromethyl)-2-sulfo-3-propyl acrylate
3-methoxy-2-sulfo-1-propyl acrylate
3-methoxy-1-sulfo-2-propyl acrylate
2-sulfocyclohexyl acrylate
2-phenyl-2-sulfoethyl acrylate
1-phenyl-2-sulfoethyl acrylate
3-sulfo-1-propyl acrylate
3-sulfo-1-butyl acrylate
4-sulfo-1-butyl acrylate
Ar-sulfophenyl acrylate
Ar-sulfophenyl methacrylate
2-(ar-sulfophenoxy)ethyl acrylate
Para-styrene sulfonic acid
Ortho-styrene sulfonic acid
Para-isopropenyl benzene sulfonic acid
Para-vinyl benzyl sulfonic acid
Ortho-isopropenyl benzyl sulfonic acid
Sodium para-styrene sulfonate
Potassium ortho-styrene sulfonate
Methyl para-styrene sulfonate
Ethyl para-vinyl benzyl sulfonate
Ortho vinyl benzene sulfonic acid
Isopropyl ortho-isopropenyl benzene sulfonate
n-Butyl ortho-styrene sulfonate
Tertiary butyl para-styrene sulfonate
2-chloro-4-vinyl benzene sulfonic acid
4-bromo-2-isopropenyl benzene sulfonic acid
3-vinyl toluene-6-sulfonic acid, sodium salt
2-ethyl-4-vinyl-benzene sulfonic acid
2,3-dichloro-4-vinyl benzene sulfonic acid
2,3,5-tribromo-4-vinyl benzene sulfonic acid
2-chloro-3-vinyl-toluene-6-sulfonic acid
2,3-diethyl-4-vinyl-benzyl sulfonate, sodium salt
Alkenyl sulfonic acid compounds:
Ethylene sulfonic acid
Sodium ethylene sulfonate
Potassium ethylene sulfonate
Methyl ethylene sulfonate
Isopropyl ethylene sulfonate
1-propene 3-sulfonic acid
1-propene 1-sulfonic acid, sodium salt
1-propene 2-sulfonic acid, ethyl ester
1-butylene 4-sulfonic acid, n-butyl ester
1-butylene 3-sulfonic acid
Tertiary butylene sulfonic acid
Sulfoalkylacrylate compounds:
Sulfomethylacrylate
2-sulfoethylacrylate
Sulfomethylmethacrylate, sodium salt
2-sulfoethylmethacrylate, methyl ester
2-sulfoethylmethacrylate, potassium salt Examples of polymerizable sulfonic acid compounds of the formula XVIII above include
Methacryloxyisopropyl acid sulfophthalate
Methacryloxyisopropyl sulfobenzoate
Methacryloxyisopropyl acid sulfosuccinate
Methacryloxyethyl sulfobenzoate
Methacryloxyisopropyl sulfopropionate There may also be used styrene disulfonic acid, vinyl-naphthalene-sulfonic acid, and β-sulfoethyl vinyl ether.

The sulfonic acid monomer may be polymerized either in its acid form or in the form of a salt of an alkali metal, ammonium hydroxide, or a volatile amine, such as trimethylamine, triethylamine, triethanolamine, diethanolamine, diethylamine, morpholine, and so on. The copolymer may be in the acid form or it may be fully neutralized or partially neutralized by a basic material, such as any of those mentioned above, and preferably by ammonium hydroxide, or by sodium, lithium, or potassium hydroxide. The copolymer is preferably in free acid form when used to make the cellular product or for impregnating a non-woven fabric so that it serves as its own acidic catalyst for the curing operation, which then requires only the application of heat such as to temperatures of 50° to 150° C. for times of a quarter minute (at the higher temperatures) to several (3 – 10) minutes at lower temperatures.

The monomers can be polymerized in conventional ways using, for example, a free-radical catalyst. The polymerization may be effected as a solution polymerization, a suspension polymerization, an emulsion polymerization, or a precipitation polymerization. Any suitable free-radical catalyst may be employed, and especially water-soluble types when the polymerization is to be effected in aqueous media. Examples include hydrogen peroxide, ammonium persulfate, or an alkali metal persulfate; a redox system using such a persulfate with a reducing agent such as sodium hydrosulfite. In solution systems involving organic solvents for the monomers and polymers, a free-radical initiator soluble in the particular medium may be employed such as benzoyl peroxide, lauroyl peroxide, tert-butyl peroxide, or hydroperoxide. The usual amounts of initiator may be employed such as from 0.1% to 6% on the weight of the monomer, and in the redox systems the persulfate may be employed in amounts of about 0.05 to 1% or so in conjunction with about 0.05 to 1% of sodium hydrosulfite.

Chain-transfer agents and other molecular weight regulators may be used.

CELLULAR ARTICLES

Any of the conventional ways of producing foamed products either of open-cell or closed-cell structure from such polymeric materials may be employed. For example, the vinyl or acrylic polymer polymerized from a monomeric mixture comprising from 0.5 to 8 weight percent of a 2-(ω-alkkenyl)-guanamine with a polyfunctional reactant, with or without a catalyst for effecting cross-linking, and with or without a plasticizer may be introduced into a chamber wherein it may be subjected to a gas under pressure and heated to fuse or coalesce the film-forming polymeric material. Upon sudden release of the gas, the mass sets into an open-cell sponge-like product.

Another procedure involves the mixing of a gas-generating substance and the polymeric material and then subjecting the mixture which may also contain a plasticizer for the polymeric material, if desired, to conditions which liberate the gas, such as heat, change of pH to either the acid or the alkaline side, and so forth. Examples of gas-generating substances include bicarbonates of sodium, potassium, calcium, bismuth, and other metals, metallic oxalates and formates, such as calcium oxalate, and sodium formate, and diazo compounds, such as amino-diazo-benzene. Other useful blowing agents are the ammonium compounds such as ammonium carbonate, ammonium bicarbonate, ammonium benzoate, ammonium nitrate, and ammonium sulfite, the nitric and nitrous acid salts, such as calcium nitrate and barium nitrite, and various metallic carbamates. Others are diphenyl-4-4'-di(sulfonyl azide) and certain lower t-alkyl ammonium nitrites, such as t-butyl-, t-octyl-, t-amyl-, and t-nonyl-ammonium nitrite.

Another procedure is to mix the polymeric material, with or without a polyfunctional reactant, with or without a catalyst for effecting crosslinking, and with or without a plasticizer for the polymeric material, and a particulate or granular solid which does not attack the polymeric material. Most advantageously water-soluble solids are used such as common salt, sugar, or sodium sulfate, which are readily soluble in water. The mixture contains a sufficiently large proportion of the soluble solid to provide intercommunicating cells upon dissolution of the solid after coalescence and gelation or setting of the polymeric material such as by heat.

A preferred procedure involves the foaming of the polymeric material by means of suitable wetting or foaming agents with agitation of such foamed mass and gelation or setting of the foamed mixture in foamed condition while exposed to the atmosphere. Suitable foaming agents include alkali metal dialkyl sulfosuccinates in which each alkyl group has between four and twenty-four carbon atoms. The dibutyl, dihexyl, and dioctyl sodium sulfosuccinates and octadecyl disodium sulfosuccinates and octadecyl disodium sulfosuccinamate are suitable for use in producing low density foams. Another satisfactory group of foam-increasing agents are the alkali metal alkylarlyl sulfates and sulfonates wherein there is present an alkyl group having from 4 to 30 carbon atoms. Examples of this group are dodecyl benzene sodium sulfonate, octyl naphthalene sodium sulfonate, dodecyl benzene ethanolamine sulfonate, monobutylphenyl-phenol sodium monosulfonate, monobutyl biphenyl sodium sulfonate, and the sodium salt of sulfated octoic acid ester of naphthol. Alkylaryl polyether alcohols and alkylarly polyether sulfonates in which the alkyl group has from 8 to 24 carbon atoms may be used. Examples of this group are the octadecyl phenol/ethylene oxide condensation product and the polymer of such product, the sodium salt of dodecyl phenol ethylene oxide sulfate, and the sodium salt of decyl phenol ethylene oxide sulfate. The manufacture of members of this group of compounds is disclosed in detail in U.S. Pats. Nos. 3,454,541, -2, -3, -4. The alkali metal or amine soaps of fatty acids having from 12 to 24 carbon atoms may be employed in preparing the composition. Examples of such soaps are sodium stearate, potassium oleate, triethanolamine, palmitate, aminoethanolamine oleate, and ammonium laurate. The sorbitan esters of acids having from 12 to 24 carbon atoms are suitable surface-active agents. Examples thereof are sorbitan monolaurate and sorbitan trioleate. Another group of foam-increasing agents comprises the polyoxyalkylene sorbitan esters of acids containing from 12 to 24 carbon atoms. Examples of these compounds are polyoxyethylene sorbitan monolaurate, polyoxyethylene sorbitan tristerate, polyoxyethylene sorbitol monolaurate, and polyoxyethylene sorbitol pentaoleate. The alkyl and alkaryl quaternary ammonium halide compounds wherein at least one alkyl group of the former has from 8 to 24 carbon atoms and at least one alkaryl group in the latter totals from 8 to 24 carbon atoms are suitable for use in the composition. Examples of such quaternary ammonium compounds are cetyl dimethyl benzyl ammonium chloride, octadecyl dimethyl benzyl ammonium chloride, octadecanol-9-dimethyl ethyl ammonium bromide and diisobutyl phenoxyethoxy ethyl dimethyl benzyl ammonium chloride. Another excellent group of foaming agent comprises the alkyl sulfates and sulfonates wherein the alkyl groups have from 8 to 30 carbon atoms. Examples thereof are lauryl sodium sulfate, octadecanol sodium sulfate, octyl alcohol potassium sulfate, lauryl methanol sulfonate, and sodium petroleum sulfonate. The sulfated and sulfonated alkyl amines and amides wherein there is at least one alkyl group having from 8 to 24 carbon atoms have been employed with success. Examples of this group are triethanolamine oleate sulfate, butyl amine salt of dodecyl benzene sulfonic acid, and the sodium salt of the sulfonated reaction product of oleyl chloride and methyl taurine, having formula

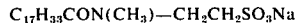

$C_{17}H_{33}CON(CH_3)$—$CH_2CH_2SO_3Na$

In one general embodiment of the preferred procedure just described, the polymeric material is in the form of an aqueous dispersion (i.e. latex) obtainable by emulsion polymerization and has a solids concentration of about 35 to about 60%, preferably 45 to 55%, at the foaming stage. If the dispersion is prepared using emulsifiers having good frothing or foaming capacities under agitation, there may be no need to add additional foaming agents. However, it is frequently desirable to add a foaming agent, such as any of those mentioned hereinabove. The total amount of foaming agent present in the composition may be from about 0.5 to 10% by weight based on the weight of addition polymer in the composition, though for most purposes, the preferred range is generally from about 1 to 3%.

Instead of introducing air by foaming or blowing other inert gases, such as carbon dioxide, nitrogen, nitrogen oxides, helium or the like, may be used.

The composition to be foamed in the preferred fashion may also include a thickener, which is a hydrophilic polymeric colloid, in an amount up to about 6% by weight, based on the weight of the liquid portion of the composition. The polymeric material itself may contain hydrophilic groups, such as carboxyl or hydroxyl in sufficient quantity to so modify the rheology of the latex that the addition of a separate thickener may be unnecessary. However, it is generally the case that the duration or stability of the foamed condition on ceasing of agitation is improved by the addition of a separate thickener in an amount of about 0.05% to 2% by weight of the aqueous portion of the composition. In addition, the polyfunctional reactant may have qualities which serve to thicken the composition and stabilize the foamed condition on ceasing of agitation. This is particularly true of formaldehyde condensates, such as a 4-pentoguanamine, urea, or melamine, which has been partially condensed to a condition approaching but not attaining the limit of water-solubility. The use of a plurality of foaming agents is also in many instances an effective expedient to enhance foam stability or durability on ceasing of agitation. Frequently, it has been found that the employment of a foaming agent having only moderate foaming capability in conjunction with another highly effective foaming agent in appropriate relative proportions serves to enhance the stability of the foam without appreciably diminishing the foaming capacity of the more efficient agent in the mixture. Such mixtures may consist of two or more different agents of the same ionic character; namely, anionic, cationic, or non-ionic, or they may consist of two or more different agents of different ionic nature; e.g., a mixture of at least one foaming agent having a non-ionic nature with at least one other having anionic or with another having cationic nature or in some instances with an agent of anionic and another of cationic nature.

In the preferred procedure, the aqueous dispersion of the polymer and foaming agent or agents, with or without a separate polyfunctional reagent, and with or without a thickener, having a solids concentration of about 35 to 60% by weight is placed in a suitable container having adequate space for the foam to be produced under conditions favoring the reaction to crosslink the polymer. The conditions include a temperature as low as room temperature or even lower. The mass may be heated to facilitate crosslinking with itself or with certain external crosslinkers, or to achieve efficiency with certain foam stabilizers. The degree of heating should be short of that causing degradation of the polymer. The composition is agitated vigorously to develop the foamed condition. The temperature may be predetermined before or after or simultaneously with the start of agitation. If the polymeric material or mixture thereof with the polyfunctional reagent reacts to form crosslinks and to set the material merely on heating, the agitation must be started early enough in the process to assure full development of the desired foamed condition before the heating sets or cures the material in untractable condition. The agitation is stopped when the predetermined extent of foaming is reached and the heating is continued to set the material in the foamed condition thus attained. If desired, a catalyst for the reaction of the polymer and/or the polyfunctional reactant may be stirred into the foamed mass shortly before stopping the agitation. After the agitation is stopped, the foamed material may be allowed to set in the container in which it is formed, the agitating device having been removed, or it may be poured onto a substrate that is to be coated with the foamed material, the setting being completed after the pouring, as by heat within, or applied to, the substrate or by prolonged storage in the ambient atmosphere. The substrate to which the foam is thus applied may serve as a permanent support as in the formation of laminar articles of which at least one layer is the foam, or the substrate may simply serve as a temporary support in the making of self-supporting sheets or blocks of the foamed material which are stripped from the substrate after being adequately set or cured.

The product may be of the closed cell type or of the open cell or intercommunicating cell type depending on the method employed for making the product. Of course, in the products of closed cell type, there may be present an appreciable number of open cells and the converse is true in the case of the open cell foamed product. Both types are useful, though for some purposes one type may be more suitable than the other. For example, the closed cell type is generally preferable for insulating purposes and when flexible for cushioning. On the other hand, the open cell type is preferable for use when absorption of a liquid or adsorption of a gas is intended. For example, the flexible, intercommunicating-cell type of product is quite useful for cleaning and scrubbing purposes, and for insulation of garments.

Regardless of which method is resorted to for forming the foamed product a plasticizer for the polymeric material may be present, particularly if the polymer is incapable of forming a continuous film at the highest temperature used in the foam-forming operation. In such event, sufficient plasticizer is included in the composition to assure the proper coalescence or fusing of the polymeric material during the operation. In many instances, no plasticizer is needed or desired, but when used, it may be present in an amount up to about 60% by weight of the polymeric material. The conventional plasticizers for the particular type of polymeric material may be used and they may be of the most common low molecular weight type or they may be of polymeric type, such as the alkyl resins.

Dyes, pigments, inert filler materials, perfumes, cosmetics, drugs, antiseptics, bactericides, detergents, ion-exchange resin particles, and other materials may be included within the polymeric material composition prior to the foaming operation. Alternatively, such materials may be incorporated into the composition during or after the foaming operatiion. Such adjuvants or additiives may be introduced for various purposes such as to incorporate an additional functional agent within the body of the cellular mass or to modify the absorptive properties thereof. For example, such hydrophilic materials as fibers or filaments of cotton, α-cullulose derived from wood pulp and rayon either of viscose or cuprammonium cellulose derivation may be introduced to increase the softness and absorptive capacity or to increase the tensile strength of the matrix. The ion-exchange material may serve as a repository of plant-nutrients.

The foam products can be made directly in the form ultimately desired; alternatively,, they may be formed in larger masses and then cut to the desired size and shape. The formation may be effected in stationary molds or continuously such as by extrusion to form rods, tubes, or slabs. They may be cast upon various substrates to form laminar products or coated products. The cellular products of the present invention may have a wide range of density starting as low as 1 pound per cubic foot. Low density products having weights of 1 to 15 pounds per cubic foot, and preferably from 2 to 4 pounds per cubic foot, are extremely desirable. In other terms, the range of density may be expressed in terms of void space in the mass. Thus the products may comprise from 5% to 98% void space or volume, and preferably have at least 50% void space.

The cellular products may be employed as expendable or disposable articles wherein they are discarded after serving one use. The cellular products of the present invention are useful as surgical dressing, sanitary napkins, tampons, and catamenial pads. They also serve as deodorant pads, dress shields, and the like. For all of these uses which may be broadly termed sanitary uses, they may be initially formed in the proper shape or they may be cut to shape from a larger mass thereof. The binders of the present invention provide a high degree of absorbency which is attributable to the component (b). The use of cellulose fiber fillers is also advisable to increase softness and absorbency. The product may be employed as a filler in a surgical dressing, catamenial pad, or the like, in which it may be disposed within a sheath of gauze or other protective material. The foamed products of this invention may also be used in brassieres, as cushioning under upholstery fabric, as drapery backing material and under floor covering. The cellular products of the present invention may be formed into thin sheets which may be fashioned into suitable form to serve as the lining in clothing, particularly for the purpose of protection of the body of the wearer against exposure to toxic gases or vapors which may be present in the air in emergency situations such as may at times occur in chemical factories, fires, or chemical warfare.

The open-cell, sponge-like articles of the present invention are extremely useful for washing and wiping purposes because of their high absorbency and because of the fact that in spite of repeated soaking and drying, this quality of absorbency remains indefinitely.

To assist those skilled in the art to practice the present invention, the following modes of operation are suggested by way of illustration, parts and percentages being by weight and the temperatures in degrees centigrade unless otherwise specifically noted.

1. A solution of 180 parts sodium vinyl sulfonate (SVS) in 5049 parts deionized water is heated to 80° C. A solution of 31.5 parts sodium persulfate in 148.5 parts water is added. During a period of 150–160 min., while the temperature of the reaction mixture is maintained at 81° ± 2° C., the following emulsified mixture is added:

| | |
|---|---|
| Deionized water | 3215.7 parts |
| Dicapryl sulfosuccinate (Na salt) (60%) in 50:50 mix of water and isopropanol | 150.3 parts |
| Methylolated Acrylamide Sol'n (50%) | 360.0 parts |
| Ethyl Acrylate (EA) | 8640.0 parts |

Note: The methylolated acrylamide is essentially a mixture of N-methylolacrylamide and acrylamide in about a 1:1 ratio.

At the end of the addition, the mixture is heated to about 85° C. to complete the polymerization. Additional initiator may be added to complete polymerization if necessary.

The product is cooled, filtered to remove small amounts of coagulum, if any, and packaged. The product is a milky-white dispersion of a copolymer of 96% ethyl acrylate, 2% sodium vinyl sulfonate, about 1.2% N-methylol acrylamide, and about 0.8% acrylamide with the following properties:

| | |
|---|---|
| % T. S. | 50.0 ± 0.5 |
| Viscosity | 200 ± 100 cps |
| pH | 2.6 ± 0.3 |

2. A viscose nonwoven batt weighing about 0.5 oz.-/yd$^2$ is padded (one dip) through a bath containing 15% polymer solids (obtained by dilution of the dispersion made in 1)) and 0.5% NH$_4$Cl as catalyst and squeezed between rolls held with an air pressure of 30 psi (one nip) to give approximately 150% wet pickup. The saturated webs are air dried and then cured for 3 minutes at 300° F. in a laboratory oven. These webs are evaluated for absorbency and tensile strength by the tests described in c) and d) of column 13, lines 56 to 75 of U.S. Pat. No. 3,705,053 above.

3. Procedure (1) is repeated except that 540 parts of sodium vinyl sulfonate and 8187 parts of ethyl acrylate is used and the 60% dicapryl sulfosuccinate is replaced with 60 parts of sodium lauryl sulfate. The resulting latex is an approximately 51% solids aqueous dispersion of a copolymer of 95% EA; 3% SVS, and about 1% each of acrylamide and metholacrylamide.

4. Procedure (3) is repeated except that the SVS is omitted, the amount of EA is changed to 8410 parts, the amount of the 50% methylolated acrylamide is doubled to 720 parts, and 225 parts of itaconic acid (IA) is added. The resulting polymer is a copolymer of 93.5% EA, 2.5% IA, about 2% acrylamide, and about 2% N-methylolacrylamide.

5. Procedure (1) above is used to prepare an aqueous dispersion of a copolymer of 92% of EA, about 1.6% of acrylamide, about 2.4% of N-methylol-acrylamide, and 4% of the sodium salt of 2-acrylamido-2-methyl-propanesulfonic acid.

6. Procedure (1) is used to prepare an aqueous dispersion of a copolymer of 92% (EA), about 1% acrylamide, about 1% N-methylolacrylamide and 65 of the sodium salt of methacryloxyisopropyl acid sulfophthalate.

7. Procedure (3) is used to produce an aqueous dispersion of a copolymer of 89% EA, 4% of itaconic acid, about 2% acrylamide, about 2% N-methylolacrylamide, and 3% of the 1:1 mole ratio adduct of butylene glycol dimethacrylate and sodium bisulfite.

8. The procedure of (1) above is repeated replacing the SVS with 180 parts of sodium α-sulfoethyl acrylate.

9. The procedure of (1) above is repeated replacing the SVS with 450 parts of sodium allysulfonate.

10. The procedure of (1) above is repeated except the SVS is omitted, 320 parts of potassium styrenesulfonate (PSS) is included in the emulsified mixture, and the EA is replace with 8500 parts of methyl acrylate (MA), resulting in an aqueous dispersion of a copolymer of about 94.5% MA, about 3.5% PSS, about 1% of N-methylolacrylamide, and about 1% of acrylamide.

11. The procedure of (10) above is repeated replacing the PSS with 550 parts of ammonium acryloxyethyl sulfopropionate (AESP) and the MA with a mixture of 600 parts of acrylonitrile (AN), 70 parts of acrylic acid (AA), 4200 parts of MA and 3400 parts of EA, resulting in an aqueous dispersion of a copolymer of about 6.1% AESP, about 6.7% AN, about 0.8% AA, about 1.0% N-methylolacrylamide, about 1.0% acrylamide, about 46.6% MA, and 37.8% EA.

12. The procedure of (10) above is repeated replacing the PSS with 880 parts of sodium acryloxyethyl o-sulfobenzoate (AESB), and the methylolated acrylamide with 800 parts of a 50% aqueous solution of N-methylol-4-pentenoguanamine (MPG), and the MA with 7720 parts EA, resulting in an aqueous dispersion of a copolymer of about 9.8% AESB, 4.5% MPG, and 85.7% EA.

13. The procedure of (1) above is repeated replacing the SVS with 660 parts of the sodium salt of acryloxyethyl acid 3,5-disulfophthalate (AEDSP), the methylolated acrylamide with 260 parts of N-methylol-$\beta$-ureidoethyl acrylate (MUA), and the EA with a mixture of 7600 parts of EA and 480 parts of $\beta$-hydroxyethyl acrylate (HEMA), resulting in an aqueous dispersion of a copolymer of about 7.3% AEDSP, 2.9% MUA, 5.3% HEMA, and 84.5% EA.

14. The procedure of (1) above is repeated replacing the SVS with 810 parts of the sodium salt of 8-acryloxyoctyl acid, 3,5-disulfophthalate (AODP), the methylolated acrylamide with 360 parts of an aqueous solution containing 80 parts of N-methylolmethacrylamide and 100 parts of N-methylol-4-pentenamide (MPA), and the EA with a mixture of 3600 parts of isopropyl acrylate (iPA) and 4400 parts of MA, resulting in an aqueous dispersion of a copolymer of about 9% AODP, about 0.9% N-methylomethacrylamide, about 1.1% MPA, 40% iPA, and 49.0% MA.

15. The procedure of (1) above is repeated replacing the SVS with 1000 parts of the ammonium salt of acryloxyethoxy-ethoxyethyl acid 4-sulfophthalate (AE3EOSP), the methylolated acrylamide with 400 parts of an aqueous solution containing 50 parts of N-methylol-allylguanamine (AMG) and 150 parts of N-methoxymethyl-4-pentenoguanamine (MOMPG) and the EA with a mixture of 4600 parts of propyl acrylate (PA) and 3300 parts of EA, resulting in an aqueous dispersion of a copolymer of about 11% AO-3EOSP, 0.5% MAG, 1.6% MOMPG, 50.5% PA, and 36.4% EA.

The followiing examples are illustrative of the production of foamed articles:

16. A mixture of 100 parts by weight of a 50% solids aqueous dispersion of the copolymer obtained by the emulsion polymerization of Procedure (1) hereinabove, 1.6 parts of an oxyethylated starch containing about 4% of ethylene oxide combined therein, 6.4 parts of a 30% solution in water of sodium tert-octylphenoxyethoxyethyl sulfonate and 3.2parts of a 70% solution in water of a tert-octylphenoxypolyethoxyethanol containing an average of about 16 oxyethylene units per molecule is placed in an open container and mechanically whipped to a foamed condition with a high speed agitator and heated to about 50° C. Then 4.8 parts of 10% hydrochloric acid (aqueous) is stirred into the foamed mass and heating is continued until a sample of the foam picked up on a glass rod no longer flows by its own weight off the end of the rod. The agitation is then stopped and the foamed mass is cast, part on a film of tetrafluoroethylene (Teflon) and part on a cotton fabric, these substrates being held in a horizontal position during the casting. The coated substrates are then dried in an oven at 150° c. and then baked an additional half hour at this temperature. The set foam is readily stripped from the Teflon film. It is quite resilient and has good resistance to tearing, to washing and to solvents. It has good wet-strength, is highly absorbent, and is readily rewettable so that it is quite useful as a sponge for wiping all sorts of wet surfaces. The cotton fabric laminate is well bonded and resistant to separation, the foamed lamination having a thickness of about 3 mm. This laminate serves very well in making an insulated undergarment which is quite warm but comfortable because of its moisture-absorbent qualities and its permeability to mositure.

17. A mixture of 100 parts by weight of the latex resulting from procedure 3) and 55 parts of hydrated alumina is mixed with 1.3 parts of oxalic acid, 1 part of urea and a mixture of 1.7 parts ethylene glycol monoethylether, 1.7 parts myristyl alcohol, 6.1 parts of a 27% solution of sodium lauryl sulfate in water, and 1.4 parts of a 70% solution in water of a tert-octylphenoxypolyethoxyethanol containing an average of about 40 oxyethylene units per molecule. Air is whipped into the mixture using an ordinary kitchen mixer (Kitchen Aid Model C) and cast at a density of about 0.40 grams per cubic centimeter on cotton print cloth at a thickness of 0.125 inches. The resultant product is dried and cured for 15 minutes at 150° C.

18. A mixture of 100 parts by weight of the latex of (4) above and 55 parts of hydrated alumina is mixed with 1.3 parts of oxalic acid, 1 part of urea and a mixture of 1.7 parts ethylene glycol monoethyl ether, 1.7 parts myristyl alcohol, 6.1 parts of a 27% solution in water of sodium lauryl sulfate and 1.4 parts of a 70% solution in water of a tertoctylphenoxypolyethoxyethanol containing an average of about 40 oxyethylene units per molecule. Air is whipped into the mixture and the foam is cast at a density of about 0.40 gram per cubic centimeter onto cottom print cloth at a thickness of 0.125 inches.

The resultant product was dried and cured for 15 minutes at 150° C.

19. A mixture of 100 parts by weight of the latex obtained by procedure (9) and 55 parts of hydrated alumina is mixed with 1.3 parts of oxalic acid, 1 part of urea and a mixture of 1.7 parts ethylene glycol monoethyl ether, 1.7 parts myristyl alcohol, 6.1 parts of a 27% solution of sodium lauryl sulfate and 1.4 parts of a 70% solution in water of a tertoctylphenoxypolyethoxyethanol containing an average of about 40 oxyethylene units per molecule. Air is whipped into the mixture using an ordinary kitchen mixer and cast at a density of about 0.39 gram per cubic centimeter onto cotton print cloth at a thickness of 0.125 inch. The resultant product is dried and cured for 15 minutes at 150° C.

20. The foams prepared in procedures 16, 17, 18 and 19 are evaluated for absorbency by measuring the time required to absorb a drop of water into the foam. That property is also measured after subjecting the foams to one cycle of the washing test c) of column 13, lines 56 to 62 of U.S. Pat. No. 3,705,053 hereinabove. The results are given in Table I.

Table III

| | Absorbency (Seconds) | |
|---|---|---|
| Polymer | Initial | After 1 Wash |
| 16) | 1 | 2 |
| 17) | 1 | 2 |
| 18) | >300 | >300 |

Table III-continued

| Polymer | Absorbency (Seconds) | |
|---|---|---|
| | Initial | After 1 Wash |
| 19) | 1 | 8 |

21. Comparable absorptive wash-durable, sponge-like masses are obtained when Procedure 17 is repeated except that the latex of Procedure (3) is replaced by a respective latex obtained in each of the following Procedures:
a. Procedure (5).
b. Procedure (6).
c. Procedure (8).
d. Procedure (9).
e. Procedure (10).
f. Procedure (11).
g. Procedure (12).
h. Procedure (13).
i. Procedure (14).
j. Procedure (15).

22. Procedure (3) is repeated except that the sodium lauryl sulfate is replaced with 150 parts of sodium dioctyl sulfosuccinate (60% in a 50:50 mixture of water and isopropanol).

A portion of the resulting latex is used to converted into a foamed product by procedure (17). The resulting laminate is highly absorptive and rewettable and is quite useful as a wiping cloth.

23. Procedure (1) is repeated except that the SVS is replaced by 210 parts of 2-acrylamido-2-methyl-3-butanesulfoni acid and the surfactant solution is replaced with 130 parts of a 50 % solution in a 50:50 mix of water and isopropanol of the sodium saltt of di-dodecyl sulfosuccinate.

A portion of the resulting latex is used to bond converted to a foamed product by procedure 17. The resulting laminate is highly absorptive and rewettable and is quite useful as a wiping cloth.

We claim:
1. As an article of manufacture an absorbent and readily wettable spone-like mass comprising a copolymer of
   a. 0.2 to 10% by weight of at least one $\alpha,\beta$- monoethylenically unsaturated monomer containing an amino group in which the nitrogen atom is attached to a carbon atom of a 1,3,5-triazine ring, a carboxylamide group, or a ureido group, the nitrogen atom of such amino, carboxylamido, or ureido group being substituted by a methylol or methoxymethyl group,
   b. 0.2 to 15% by weight of at least one $\alpha,\beta$-monoethylenically unsaturated monomer, in acid or salt form, having a sulfur-containing acid group and containing no basic nitrogen atom, and
   c. the balance to make 100% by weight, of at least one other $\alpha,\beta$-monoethylenically monomer which contains no basic nitrogen atom.

2. As an article of manufacture, an absorbent and readily wettable sponge-like mass comprising a copolymer according to claim 1 wherein the copolymer comprises from about 0.5–10% by weight of monomeric material (a) and from about 0.5 to 8% by weight of monomeric material (b).

3. As an article of manufacture, an absorbent and readily wettable sponge-like mass comprising a copolymer according to claim 2 wherein the copolymer comprises from about 0.5 to 4% by weight of monomeric material (a) and from about 0.5 to 8% by weight of monomeric material (b).

4. An article according to claim 3 wherein the mass contains intercommunicating cells.

* * * * *

UNITED STATES PATENT AND TRADEMARK OFFICE
CERTIFICATE OF CORRECTION

PATENT NO. : 3,992,333
DATED : November 16, 1976
INVENTOR(S) : William D. Emmons et al.

It is certified that error appears in the above-identified patent and that said Letters Patent are hereby corrected as shown below:

Column 3, lines 37-38 - IV and V should read -- (IV) and (V) --.

Column 4, line 65 - please insert the following sentence:
-- Methylolated B-(N, N-ethyleneureido) ethyl fumarate --.

Column 7, line 15 - Please delete the number "20".

Column 7, line 17 - please delete letter "a" and insert
-- $\alpha$ --.

Column 13, line 32 - between the word "which" and "does" insert the phrase -- is soluble in a solvent which --.

Column 13, line 68 - please delete "U. S. Patent No. 3,454,541" and in lieu thereof insert -- U. S. Patent No. 2,454,541 --.

Column 18, line 17 - please delete the word "above".

Column 18, line 39 - delete the figure "65" and in lieu thereof insert --6%--.

Column 20, line 61 - delete the word "hereinabove".

Column 20, line 63 - delete "Table III" and in lieu thereof insert -- Table I --.

Column 22, line 1 - delete the phrase "used to bond".

Signed and Sealed this

Eighth Day of March 1977

[SEAL]

Attest:

RUTH C. MASON
Attesting Officer

C. MARSHALL DANN
Commissioner of Patents and Trademarks